(12) United States Patent
Langstaff et al.

(10) Patent No.: US 8,377,366 B2
(45) Date of Patent: Feb. 19, 2013

(54) IN-MOULD LABELLING PROCESS

(75) Inventors: Stephen Langstaff, Wigton (GB); Richard Waning, Wigton (GB)

(73) Assignee: Innovia Films Limited, Wigton, Cumbria (GB)

( * ) Notice: Subject to any disclaimer, the term of this patent is extended or adjusted under 35 U.S.C. 154(b) by 0 days.

(21) Appl. No.: 13/017,991

(22) Filed: Jan. 31, 2011

(65) Prior Publication Data

US 2011/0189397 A1    Aug. 4, 2011

(30) Foreign Application Priority Data

Feb. 1, 2010  (GB) .................................. 1001587.3

(51) Int. Cl.
*B29C 49/24* (2006.01)
(52) U.S. Cl. .................. 264/509; 264/510; 264/132
(58) Field of Classification Search .................. None
See application file for complete search history.

(56) References Cited

U.S. PATENT DOCUMENTS 4,662,528 A    5/1987  Slat
2007/0222207 A1*  9/2007  Hendry et al. ............... 283/101

FOREIGN PATENT DOCUMENTS

| EP | 0 326 355 | 8/1989 |
|---|---|---|
| EP | 1 795 452 | 6/2007 |
| WO | 87-05276 | 9/1987 |
| WO | 2005-113653 | 12/2005 |

OTHER PUBLICATIONS

Combined Search and Examination Report under Sections 17 and 18(3) of Application No. GB1001587.3, Feb. 2012.

* cited by examiner

*Primary Examiner* — Monica A Huson
(74) *Attorney, Agent, or Firm* — Ping Wang; Anerews Kurth, LLP

(57) ABSTRACT

There is disclosed a process for manufacturing an in-mold labelled article, the process comprising the steps of: placing a label comprising a polyvinylidene chloride coated film (15) into a mold for injection molding, thermoforming, or blow molding; holding the label in position; injecting a polymeric melt into, or thermoforming or blowing a polymeric preform in said mold so as to bind with the label; and removing the article from the mold. A process of in-mold labelling using a label comprising a polyvinylidene chloride coated film is also disclosed.

19 Claims, 5 Drawing Sheets

IN-MOULD LABELLING PROCESS

FIELD

The present application relates to a process for manufacturing an in-mould labelled article using a label comprising a polyvinylidene chloride coated film.

BACKGROUND

The technique of in-mould labelling (IML) has been known for many years. It involves the use of paper or plastics labels which ultimately form an integral part of the moulded product. The in-mould labels must, therefore, be able to tolerate the heat applied during the moulding process. The resultant product is a pre-decorated item, such as a container or the like, which may be filled thereafter. In contrast to glue applied or pressure-sensitive labels which appear above the surface of the container, in-mould labels appear as part of the container. Effectively, in-mould labelling eliminates the need for a separate labelling process following the manufacture of the container, which reduces labour and equipment costs.

In-mould labels generally comprise a carrier base, consisting of a polymeric or cellulosic carrier film, on which a decorative pattern or a written message is printed. The thus obtained label is subsequently positioned against a wall of a mould for injection moulding or for blow moulding or the like, held in place by various means, such as electrostatic forces or vacuum suction, and a polymeric article is moulded by injecting a mass of polymeric melt or by blowing a polymeric parison against the mould walls on which the in-mould label is applied. The adhesion of such labels to the polymeric article can be enhanced by applying a heat sealable layer (a film or a coating) onto the backing side (i.e., not printed surface) of the in-mould label which is to be in contact with the polymeric article.

In-mould labels can be used to cover a portion of a container or to cover the entire outer surface of a container. In the latter case, the in-mould label serves as an additional layer and may, therefore, enhance the structural integrity of the container.

Laminate films or multi-layer films are also well known and have particular packaging applications in the food industry, and pharmaceutical, medical and health care products. An important aspect of laminate films when used in packaging food, for example, is to prevent the ingress of moisture and air into the container which would otherwise cause the food therein to degrade undesirably quickly.

To counteract this effect, US 2009/0061062 describes a multilayer film having an active oxygen barrier and at least one layer containing an iron-based scavenging composition. In particular, ethylene vinyl alcohol copolymer (EVOH) is known as a good oxygen barrier material, and is widely used in conjunction with multi-layer packaging films. Oxygen barrier materials are employed in retort processes such as retort sterilisation and retort cooking. In retort processes, heat and pressure are used to cook or sterilise food in a sealed package. Retort conditions can be demanding with temperatures typically ranging from 115° C. to 130° C. under pressurised steam. However, under these retort conditions, many oxygen barrier polymers including EVOH can become damaged, distorted, delaminated, or they may lose their oxygen barrier properties during or after retorting due to absorbed moisture. The Oxygen barrier properties of the EVOH layer of a multi-layer film are reduced if exposed to high humidity. Therefore, the EVOH layer is usually protected by an outer layer that has good moisture barrier properties (such as polypropylene).

However under the high temperature conditions experienced during the retort process, the moisture barrier properties of the protective layer is dramatically reduced. This phenomenon is known as "retort shock" in which moisture is trapped in the oxygen barrier layer, such as EVOH, during the retort process—thus leading to a drop in the barrier properties of the EVOH layer so as to allow the ingress of oxygen into the container.

There is a need for an article, such as food packaging or the like, involving in-mould labelling which does not suffer from the above-mentioned disadvantages. From the description that is to follow, it will become apparent how the present invention addresses the above-mentioned deficiencies associated with prior art constructions, while presenting numerous additional advantages not hitherto contemplated or possible with prior art techniques.

BRIEF DESCRIPTION OF THE FIGURES

Embodiments of the present invention will now be described, by way of example only, with reference to and as shown in the accompanying drawings, in which.

DETAILED DESCRIPTION

According to a first aspect of the present invention, there is provided a process for manufacturing an in-mould labelled article, the process comprising the steps of:

placing a label comprising a polyvinylidene chloride (PvdC) coated film into a mould for injection moulding, thermoforming, or blow moulding;

holding the label in position;

injecting a polymeric melt into, or thermoforming or blowing a polymeric preform in said mould so as to bind with the label; and removing the article from the mould, wherein the label is oriented in the mould so that the PvdC coating on the film lies on or towards the exterior surface of the label when retrieved from the mould, and wherein the PvdC coating on the film is shielded from the melt during the process by interposing between the coating and the melt during the process a substrate layer of the film.

The film may have a monoweb or laminate structure, whether by coextrusion, lamination, extrusion coating or further or alternative coating, or any combination thereof. The label must comprise at least a substrate material and a PvdC coating thereon.

The PvdC coating on the film of the in-mould label allows the label to retain its oxygen barrier properties during and after a retort sterilisation or cooking process, during which conditions of high humidity are likely to be encountered in the mould. The PvdC coating inhibits the ingress of oxygen therethrough even under such high humidity conditions. In this way, the problem of retort shock is addressed. One advantage of this is to extend the shelf life of products retained in packaging which undergo retort sterilisation or cooking processes.

It could be considered counter-intuitive to employ a compound comprising chlorine for use during high temperature processes such as in-mould labelling due its degradation leading to potential toxicity or environmental issues. For example, it may be expected that chlorine would be liberated in the form of HCl at the elevated temperatures used during the moulding process but, contrary to expectation, it was found that PvdC does not undergo dehydrochlorination under these conditions, as is shown by the experimental data below.

As will be explained in the experimental section, PvdC appears to undergo dehydrochlorination at temperatures of approximately 200° C. However, typical in-mould conditions also may comprise temperatures at around this level, or higher. Consequently, it might be thought that an in-mould labelling process utilising a PvdC coating would risk liberating HCl in the process. We have found, however, that such risks can be avoided by shielding the PvdC coating to some extent within the mould.

In a typical in-mould labelling process the mould itself is chilled so that the molten polymer supplied to the mould cools and hardens rapidly against the mould surface once injected. Typical in-mould temperature conditions are from 191-232° C. for the melt, and 32-66° C. for the mould.

We have found that by providing the in-mould label as a PvdC-coated substrate, and by using the substrate to shield the coating from the high temperatures of the melt during coating, we can prevent the PvdC coating from reaching its decomposition temperature, or from doing so for long enough to decompose.

Consequently, in the process according to the invention, the label is oriented in a mould so that the PvdC coating on the film lies on or towards the exterior surface of the label when retrieved from the mould.

Thus, when the label comprises a substrate material and a PvdC coating thereon, in the mould the PvdC coating lies between the substrate and the mould exterior. Typically the mould will be chilled and will receive in use a molten polymeric material for moulding into the form of a container or other article. The molten polymeric material may have a high temperature—for example above 200° C. when it enters the mould, and if directly exposed to such temperatures for a prolonged period of time, the PvdC coating may dehydrochlorinate. However, we have found that if the PvdC coating is protected from such direct exposure by the presence of the substrate material of the label (e.g. polypropylene) lying between the coating and the molten material as it enters the mould, no such dehydrochlorination occurs. This may be explained by one or more of the following:

The substrate protects the PvdC coating from decomposition by performing an insulation function;

The chilled mould helps to keep the PvdC coating below decomposition temperature during the moulding process;

The moulding process is sufficiently rapid that decomposition of the PvdC does not occur in the time available, before the molten material supplied to the mould cools down.

Preferably, the label has an outside which faces the mould exterior in the process of the invention, and an inside which faces the mould interior in the process of the invention. When molten material is injected into the mould it makes contact with the inside of the label, but preferably not the outside. Preferably, the PvdC coating on the label lies at or towards the outside of the label.

Preferably the label comprises the PvdC coating and a substrate material, the thickness of the substrate material being at least about 15 µm, preferably at least about 20 µm, more preferably at least about 30 µm and most preferably at least about 40 µm. Generally speaking, the thicker the substrate, the better its ability to insulate the PvdC coating against heat from the molten material entering the mould, but such considerations must be tempered by considerations such as cost, functionality and aesthetics.

It is well known in the art [see for example Thermal stabilisation of poly(vinyl chloride) by organotin compounds—Polymer Degradation and Stability, Volume 88, Issue 1, April 2005, Pages 46-51] that certain additives can be used to delay the onset of dehydrochlorination of PvdC. In the present invention, such additives may optionally be incorporated into the PvdC coating to provide additional thermal stabilisation of the coating.

Barrier properties of the film used in the in mould labelling process of the invention may be further improved by the inclusion in or on the film of a transparent inorganic coating. Suitable inorganic materials include metal and metalloid oxides and nitrides such as silicon oxides (SiOx), aluminium oxides (AlOx), silicon nitrides ($Si_3N_4$) provided together with carbon, hydrogenated versions of silicon nitride, and mixtures of two or more thereof. Suitable techniques for depositing such coatings on the film include vapour deposition, physical vapour deposition (PVD), plasma enhanced chemical vapour deposition (PECVD), dielectric barrier discharge or magnetron or radio frequency generated plasma electron beam evaporation sources, induction heated evaporation sources, magnetron sputter deposition sources and atomic layer deposition (ALD)

Thermogravimetric Analysis of PvdC Coatings

Summary: Analysis has shown there is a slight weight loss around 130° C. for PvdC lattices; the evidence to date suggests that this may be water. A second and more significant weight loss occurs around 200° C. which coincides with dehydrochlorination.

Films with a PvdC coating were evaluated for use as in-mould labels. In use in in-mould labeling, such films are likely to be subjected to relatively high temperatures—for example temperatures of from 100° C. to 150° C.—and this evaluation was intended to ascertain whether at such temperatures, thermal degradation would be experienced. Accordingly a screen of three PvdC lattices was carried out using thermogravimetric analysis (TGA).

Filmic samples of PvdC, cast from THF, were placed in an aluminium dish and left to air dry for about two months. Samples of this dried material were taken and the weight loss profile as a function of temperature determined.

Thermogravimetric Analysis in Nitrogen—Results

Figure 1:
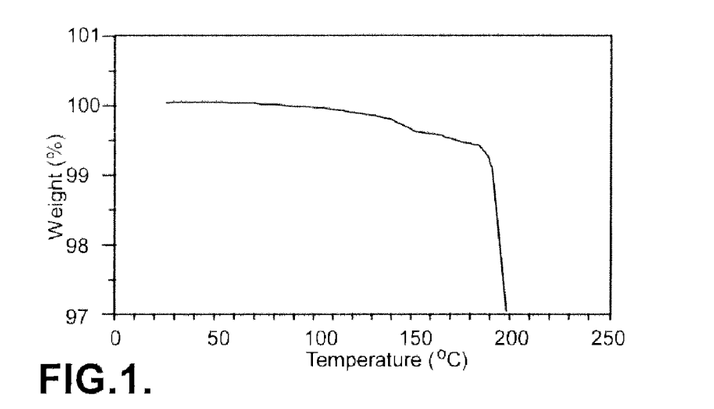
FIG. 1 is a graph illustrating weight loss of PvdC at low temperatures under nitrogen.

Samples of approximately 10 mg were heated at 10° C./minute in nitrogen, with air introduced at 750° C. from which the onset temperature and weight loss have been calculated. FIG. 1 shows a pyrogram of the data of table 1 below.

TABLE 1

| | First weight loss | | Second weight loss | |
|---|---|---|---|---|
| Sample | Onset (° C.) | Weight loss (%) | Onset (° C.) | Weight loss (%) |
| PvdC (1) | 132.2 | 0.57 | 208.7 | 73.0 |
| PvdC (2) | 133.4 | 0.43 | 209.8 | 73.2 |
| PvdC (3) | 134.3 | 0.59 | 210.3 | 73.0 |

Thermogravimetric Analysis in Air—Results

Figure 2:
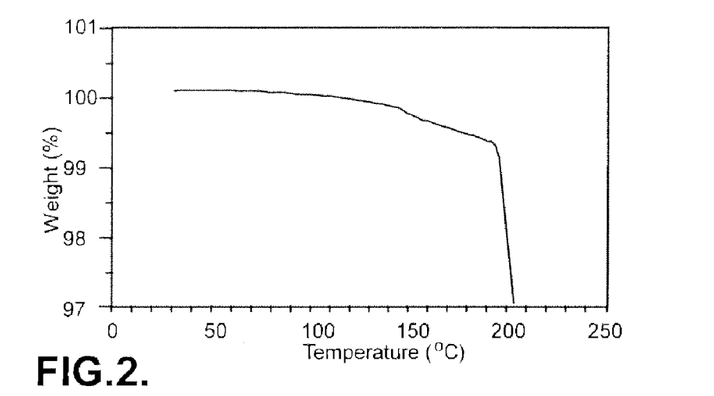
FIG. 2 is a graph illustrating weight loss of PvdC at low temperatures in air.

Samples of approximately 10 mg were heated at 10° C./minute in air from which the onset temperature and weight loss have been calculated. FIG. 2 shows a pyrogram of the data of table 2 below.

TABLE 2

| | First weight loss | | Second weight loss | |
|---|---|---|---|---|
| Sample | Onset (° C.) | Weight loss (%) | Onset (° C.) | Weight loss (%) |
| PvdC (1) | 133.0 | 0.55 | 209.2 | 64.4 |
| PvdC (2) | 123.9 | 0.63 | 210.5 | 64.1 |
| PvdC (3) | 117.7 | 0.44 | 207.3 | 64.3 |

Under nitrogen a small weight loss was observed above 130° C. (see FIG. 1). This weight loss was also observed to a similar magnitude in air (see FIG. 2). The temperature at which this small weight loss occurs is higher than would usually be expected for liberation of water, but this may be a function of the fact that the samples were air dried over a long period of time, and so some residual locked-in moisture may have remained in the dried samples.

Figure 3:
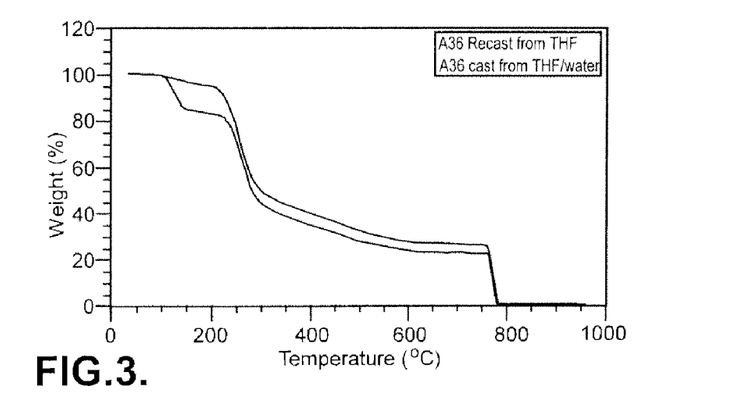
FIG. 3 is a graph illustrating weight loss of PvdC recast from THF and THF/Water, under nitrogen.

To test this theory, a further sample was cast from THF and water, and re-tested as above. The first weight loss from this sample was seen to increase in magnitude, and at a slightly lower temperature of around 100° C. A similar sample re-cast from THF only also gave a slight rise in the magnitude of this weight loss, but less so than the sample with added water (see FIG. 3). Considering THF is highly miscible with water and hence shows some hygroscopic tendencies, this increase may be attributed to water. Overall this evidence suggests the minor weight loss just above 100° C. is associated with water bound within the matrix.

Figure 4:
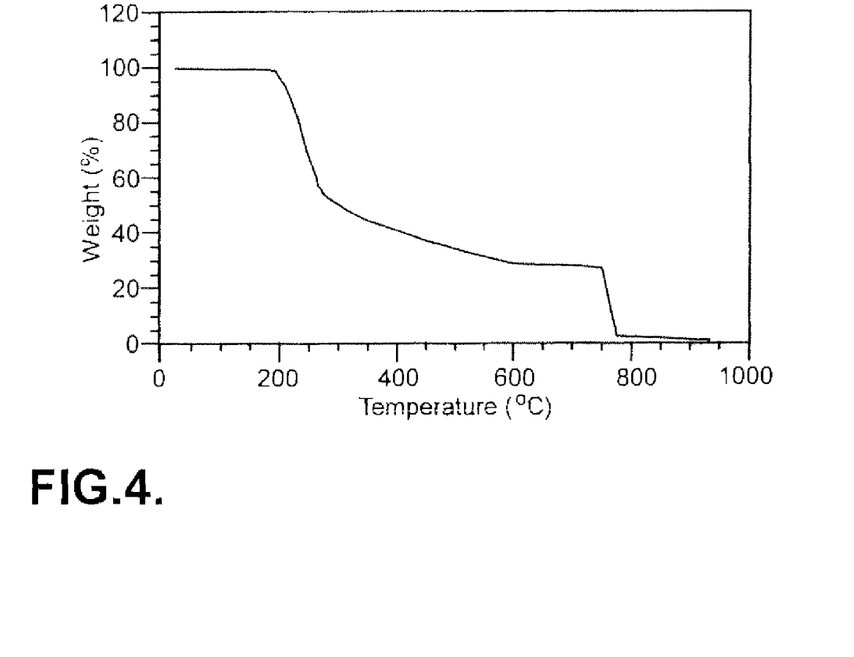
FIG. 4 is a graph illustrating weight loss of PvdC in Nitrogen (air introduced at 750° C.)

The major weight loss for these materials occurs around 200° C., with this equating to 73% of the sample matrix under nitrogen, which is consistent with the 75% expected for dehydrochlorination. From FIG. 4, it appears that this occurs as a two step process prior to the loss of any carbonaceous residue on introduction of air at 750° C.

Figure 5:
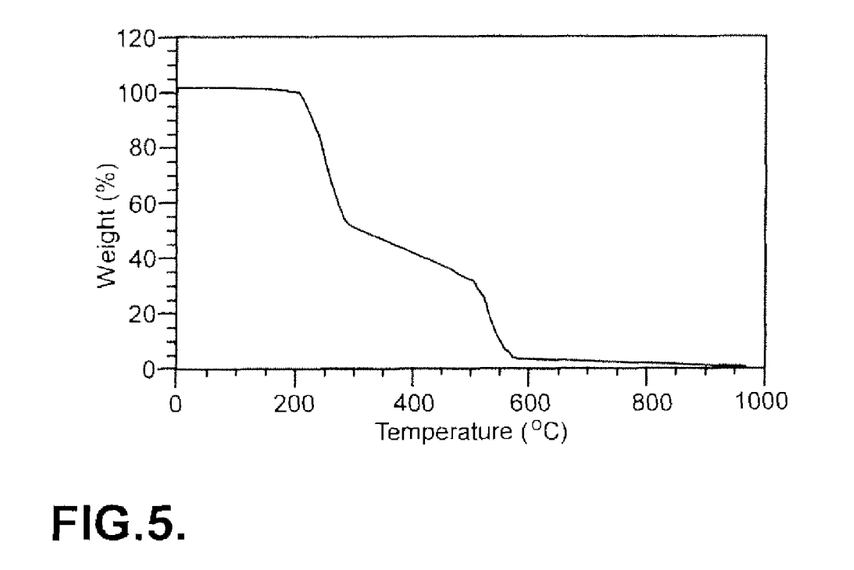
FIG. 5 is a graph illustrating weight loss of PvdC in air.

In air, the two steps become more distinct (see FIG. 5), but the second of these coincides with the loss of carbon residue as carbon dioxide. Accordingly, this second weight loss appears smaller in air at 64%, but this is only because it does not cover the full range of the decomposition identified under nitrogen.

Analysis has shown that at low temperatures there are two clear weight losses with PvdC. Evidence suggests the first around 130° C. may be associated with residual moisture. The second decomposition around 200° C. is consistent with dehydrochlorination of the PvdC.

Figure 6:
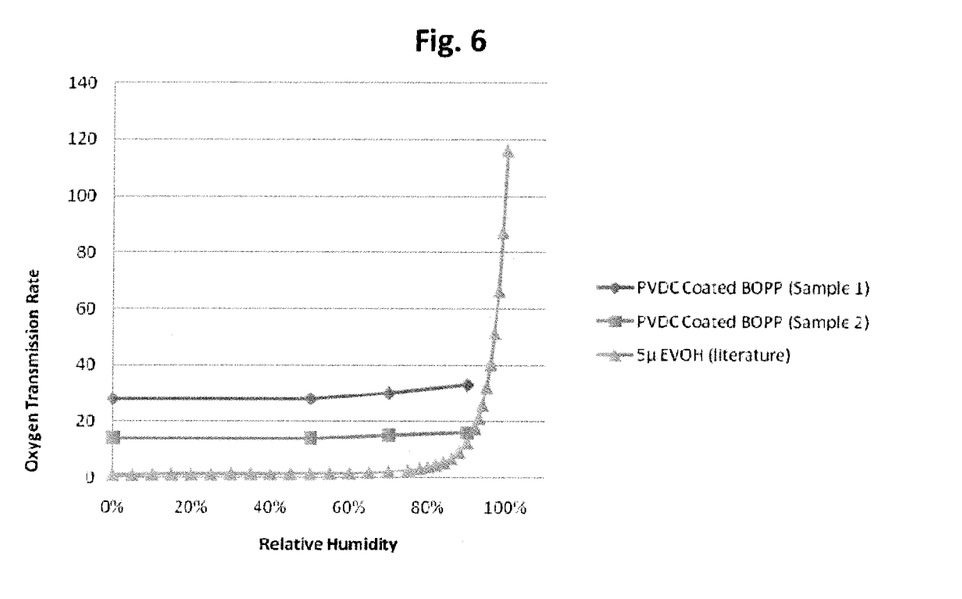
FIG. 6 is a graph illustrating OTR at varying RH for an EVOH film and PvdC film.

The experimental analysis conveys that PvdC is a suitable material for coating a laminate film forming at least part of an in-mould label. The oxygen transmission (OTR) rates of films comprising PvdC and EVOH as a function of room humidity (RH) were compared. The results are shown in FIG. 6. The data plotted for the EVOH is literature values taken from the Nippon Gohsei website for 29 mol % EVOH at 20° C. The data obtained for PvdC is shown in table 3 below.

TABLE 3

| | Oxygen Transmission Rate (cm3/m2/day) | |
|---|---|---|
| | Sample 1 | Sample 2 |
| 0% RH | 28 | 14 |
| 50% RH | 28 | 14 |
| 70% RH | 30 | 15 |
| 90% RH | 33 | 16 |

Sample 1 was a 58 μm 5-layer laminate polypropylene film coated at a coat weight of 2.7 gsm with Diofan A036 commercially available from Solvay SA.

Sample 2 was a 58 μm 5-layer laminate polypropylene film coated at a coat weight of 2.7 gsm with Diofan B200 commercially available from Solvay SA.

Figure 7:
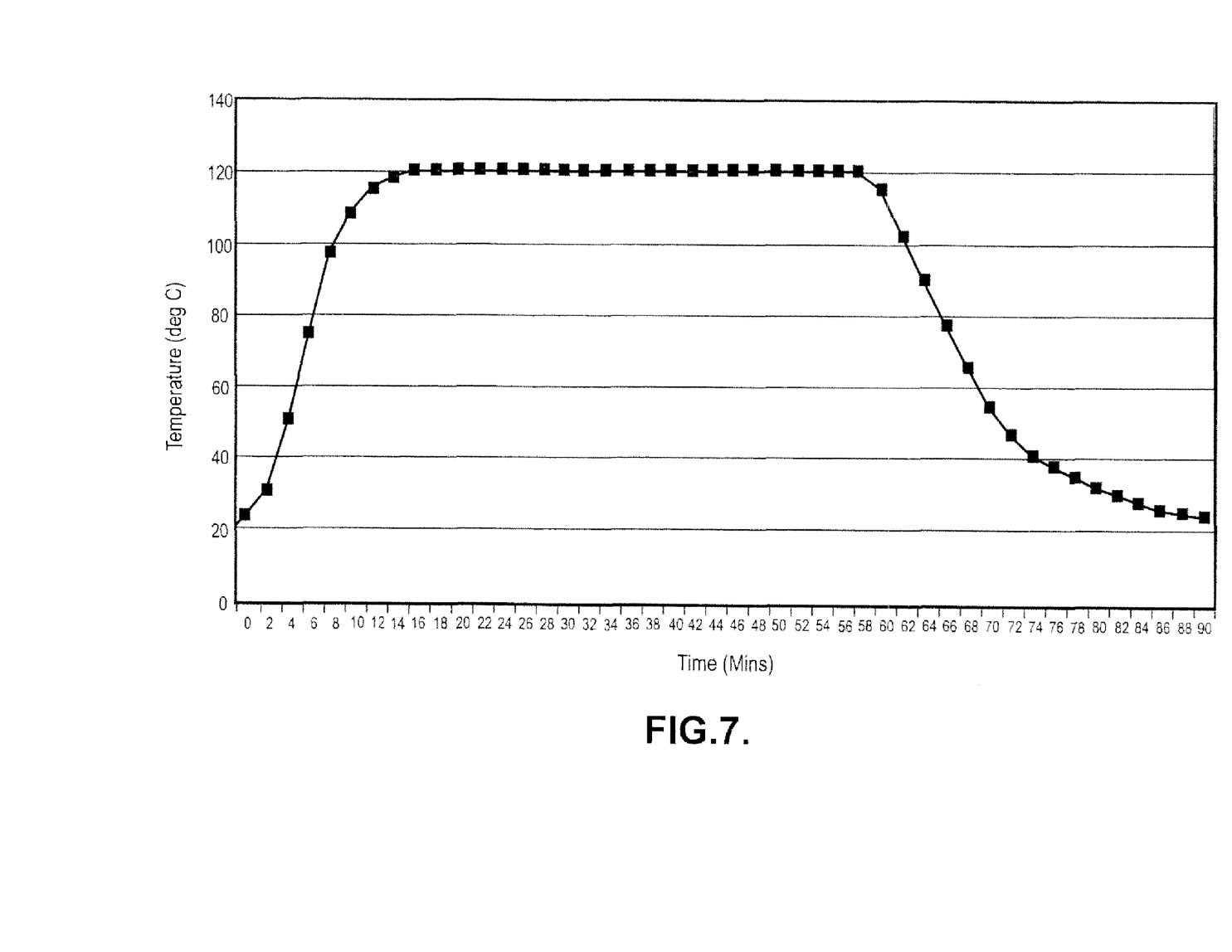
FIG. 7 is a graph illustrating typical retort conditions for barrier modelling.

From FIG. 6, it can be seen that the EVOH containing film has a generally low OTR and this remains generally constant from 0% to about 80% RH, at which point when the OTR begins to increase; a sharp increase is seen from 90% to 100% RH, which simulates retort processing conditions. The EVOH film does not perform well as an oxygen barrier at high RH. The OTR of the PvdC film is shown to be generally low and constant from 50 to 90% RH. Typical retort conditions for barrier modelling are shown in FIG. 7 (time versus temperature graph).

A label comprising a PvdC coated laminate film for in-mould labeling is less susceptible to the problems associated with "retort shock" for the reasons provided herein.

The above described in-mould labels are greatly advantageous over traditional labels to be applied to an article after manufacturing thereof in that, on the one hand, the label is intimately bonded to the article and, therefore, highly resistant to ripping and, on the other hand, in terms of logistics because the polymeric articles to be labelled do not need to be stored and transported to the premises where traditional labels are to be applied. Among the many shortcomings of the prior art are that labels become easily scratched; there is not a solid bond between the label and the plastic part which results in peeling; and, the part is not recyclable for the reason that the labels are not compatible with the underlying plastic piece. Additionally, there is added cost to the process of applying the label since it must be handled once for the moulding process and a second time to add the label.

In-mould labelling using labels comprising PvdC addresses these deficiencies in that the labels do not get scratched easily because they are more durable in adverse conditions (compared to traditional stick-on labels); peeling does not result due to the integral bond between the label and the moulded article; the label is not subject to fading under UV rays; the labels is compatible with the material of the article and, therefore, recycling of the entire product is possible, in keeping with environmentally friendly practice. The final product is also cleaner and more sanitary than prior art products because less handling of the label is involved during in-mould labelling.

A further advantage may be considered as the combination of using a PvdC coated laminate film in an in-mould labelling process.

The polyvinylidene chloride surface may be printable. Suitable text or graphic can thus be illustrated on the article.

The polyvinylidene chloride surface may be printed with a heat-resistant ink. The ink may, therefore, withstand the elevated temperatures during the moulding process.

The polyvinylidene chloride coat may have a coat weight of at least about 1 gsm preferably from about 1.5 gsm to about 4 gsm, more preferably from about 1.8 gsm to about 3.7 gsm, and most preferably from about 2 gsm to about 3.5 gsm. Barrier properties of the film will generally be improved by higher coat weights, but such considerations must be balanced by the possibly conflicting considerations of cost, aesthetics and other types of (non-barrier) functionality.

The film substrate may comprise a polyolefin film, for example polyethylene, polypropylene, mixtures thereof, and/or other known polyolefins. The polymeric film can be made by any process known in the art, including, but not limited to, cast sheet, cast film and blown film. The film substrate may be of monolayer or of multi-layer construction. This invention may be particularly applicable to films comprising cavitated or non-cavitated polypropylene films, with a polypropylene core and skin layers with a thickness substantially below that of the core layer and formed for example from co-polymers of ethylene and propylene or terpolymers of propylene, ethylene and butylene. The film may comprise a biaxially orientated polypropylene (BOPP) film, which may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

Alternatively, the film core layer may comprise a polyester film, a polyamide film, or an acetate film, for example.

The core layer may be non-cavitated, or may be cavitated if an opaque film is desired.

Thus, the label of the invention preferably comprises a PvdC coated substrate, wherein the substrate is preferably a polyolefin substrate, for example a polypropylenic substrate such as BOPP. The substrate may be a monoweb, or may have a multi layer construction, whether by coextrusion, coating or lamination or any combination thereof. Preferred substrates comprise a BOPP core and coextruded terpolymeric skin layers. The substrate or the skin layers of the film may comprise additional materials such as anti-block additives, opacifiers, fillers, UV absorbers, cross-linkers, colourants, waxes and the like.

The film of the invention may be further treated, by corona discharge treating for example, further to improve ink receptivity of the film or of the skin layer of the film.

The label of the invention may be provided with other layers, such as primer layers, print layers, overlaquers, and the like.

During in-mould labelling, the label may be held in position by at least one of a vacuum, compressed air and static electricity.

The label may be placed into the mould by at least one of feeding the label into the mould by means of a belt, the label falling under gravity from a magazine into the mould, and placing of the label by a handling unit, preferably a robot. Use of a robot minimises human error and improves sanitation of the final product.

The label may cover the entire outer surface of the article. In other embodiments, only a portion of the outer surface of the article may be covered. Label coverage may be dependent on the intended use of the article.

Figure 8:
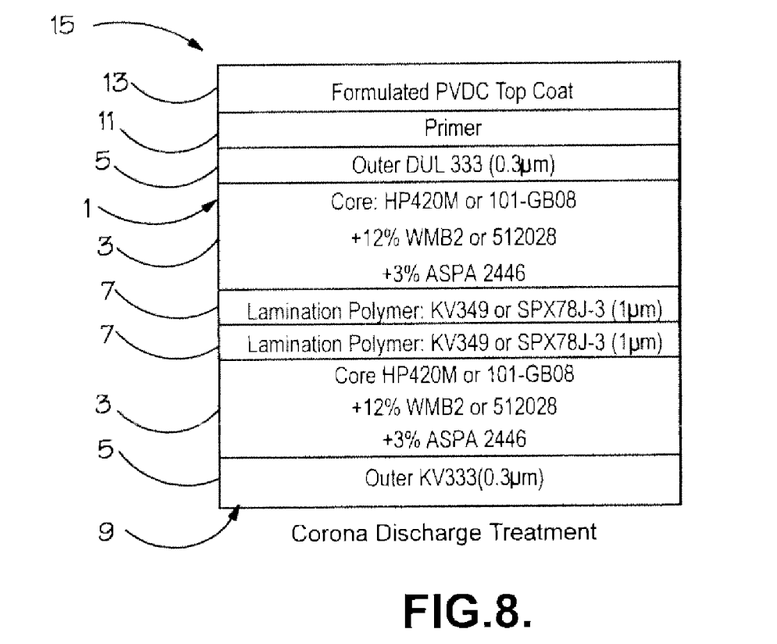
FIG. 8 is a schematic drawing of PvdC coated laminate film which can form at least part of a label for an in-mould labelling process according to the invention.

With reference to FIG. 8, there is shown a PvdC coated laminate film (15) which can form at least part of a label for in-mould labelling (IML).

Preparation of Barrier IML Film (Solid White)

A three layer polymeric tube (1) was formed by co-extruding a core layer (3) (comprising polypropylene homopolymer (HP420M or 101-GB08), 12% of 70% $TiO_2$, and 3% antistatic masterbatch containing a blend of glycerol mono stearate and ethoxylated amine) with a layer of polyethylene/polypropylene/polybutylene terpolymer (KV333—a random copolymer comprising polypropylene/ethylene/butylene-1) as an outer skin layer (5) (first sealing layer) on one side of the core layer (3), and on the other side of the core layer (3) there is a laminating layer (7) (KV349—a polypropylene-polyethylene/-polybutylene random terpolymer). The tube (1) was cooled and subsequently reheated before being blown to produce a three layer biaxially oriented film tube. The film tube (1) was then nipped and laminated to itself (laminating layer to laminating layer constituting one internal layer) spliced to form a laminated film with five layers to provide a 58 μm thickness laminate film (9). The laminate film (9) is also provided with a further layer of primer (11) (NeoRez R610).

The laminate film (9) was then coated with a PvdC layer (13) (Diofan B200) to produce the PvdC coated laminate film (15).

It will be understood that similarly constituted clear films may be prepared as above, but with the omission of $TiO_2$.

Preparation of Barrier IML Film (Matt White)

Figure 9:
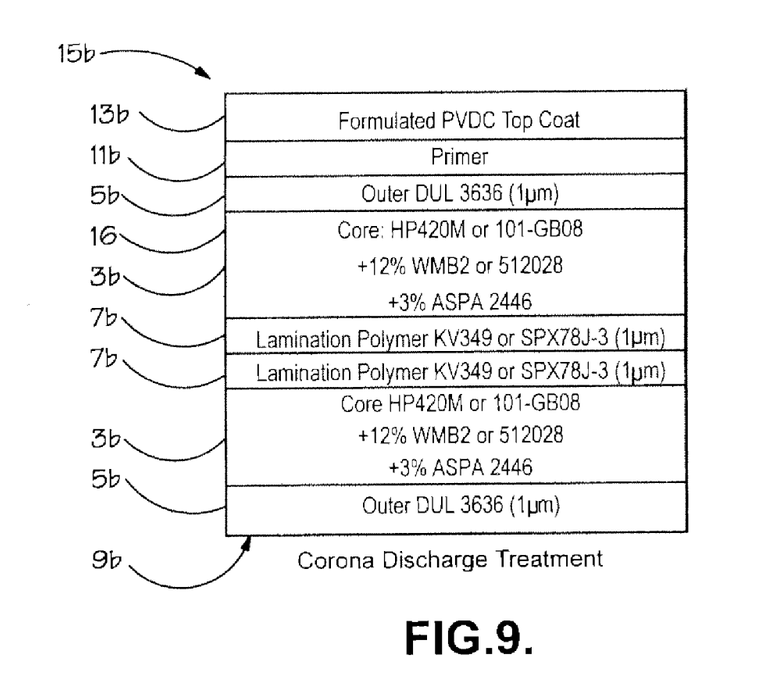
FIG. 9 is an alternative PvdC coated laminate film which can form at least part of a label for an in-mould labelling process according to the invention.

FIG. 9 illustrates an alternative PvdC coated laminate film (15b) which is similar to that of FIG. 9, except that the outer skin layer (5b) is constituted by a proprietary incompatible blend of polypropylene and polyethylene (DUL3636). Similar reference numerals, therefore, denote similar features. Again, a corresponding clear film may be prepared in this manner, whilst omitting $TiO_2$.

The PvdC coated laminate film of FIG. 8 or 9 may form at least part of an in-mould label and used in a process as described below.

A process for manufacturing in-mould labelled packaging for food involves the steps of:

placing a label comprising the PvdC coated laminate film (15/15b) of FIG. 8 or 9 into a mould for injection moulding (in other embodiments, this may involve thermoforming or blow moulding);

holding the label in position by vacuum (in other embodiments, this may involve using compressed air or static electricity);

injecting a polymeric melt into said mould so as to bind with the label (in other embodiments, this may involve thermoforming or blow blowing a polymeric preform); and removing the packaging from the mould.

The resulting in-mould labelled packaging is less susceptible to the phenomenon of "retort shock".

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates the contrary.

What is claimed is:

1. A process for manufacturing an in-mould labelled article, the process comprising the steps of:
    placing a label comprising a polyvinylidene chloride (PvdC) coated film into a mould for injection moulding, thermoforming, or blow moulding;
    holding the label in position;
    injecting a polymeric melt into, or thermoforming or blowing a polymeric preform in said mould so as to bind with the label; and
    removing the article from the mould,
    wherein the label is oriented in the mould so that the PvdC coating on the film lies on or towards the exterior surface of the label when retrieved from the mould, wherein the PvdC coating on the film is shielded from the melt during the process by interposing between the coating and the melt during the process a substrate layer of the film and wherein the PvdC coating has a coat weight of at least about 1 gsm.

2. The process according to claim 1, during which the melt or preform does not contact the exterior surface of the label.

3. The process according to claim 1, wherein the label is held in position by at least one of a vacuum, compressed air and static electricity.

4. The process according to claim 1, wherein the label is placed into the mould by at least one of feeding the label into the mould by means of a belt, the label falling under gravity from a magazine into the mould, and placing of the label by a handling unit, optionally a robot.

5. The process according to claim 1, wherein the label covers at least about 50% of the entire outer surface of the article.

6. The process according to claim 1, comprising providing the mould at a lower temperature than that of the melt.

7. The process according to claim 1, wherein the PvdC surface is printable.

8. The process according to claim 7, further comprising printing on the PvdC surface after removal of the article from the mould.

9. The process according to claim 1, wherein the PvdC surface printed with a heat-resistant ink.

10. The process according to claim 1, wherein the PvdC coating has a coat weight in the range of from about 1.5 gsm to about 4 gsm.

11. The process according to claim 1, wherein the film is provided with a transparent inorganic coating to enhance its barrier properties.

12. The process according to claim 11, wherein the transparent inorganic coating comprises a metal or metalloid oxide or nitride.

13. The process according to claim 12, wherein the transparent inorganic coating comprises an aluminium or silicon compound.

14. A process for manufacturing an in-mould labelled article, the process comprising the steps of:
    placing a label comprising a polyvinylidene chloride (PvdC) coated film into a mould for injection moulding, thermoforming, or blow moulding, wherein the film is provided with a transparent inorganic coating to enhance its barrier properties;
    holding the label in position;
    injecting a polymeric melt into, or thermoforming or blowing a polymeric preform in said mould so as to bind with the label; and
    removing the article from the mould,
wherein the label is oriented in the mould so that the PvdC coating on the film lies on or towards the exterior surface of the label when retrieved from the mould, and wherein the PvdC coating on the film is shielded from the melt during the process by interposing between the coating and the melt during the process a substrate layer of the film.

15. The process according to claim 14, wherein the transparent inorganic coating comprises a metal or metalloid oxide or nitride.

16. The process according to claim 15, wherein the transparent inorganic coating comprises an aluminium or silicon compound.

17. The process according to claim 14, wherein the substrate film has a thickness of at least about 15 µm.

18. The process according to claim 14, wherein the substrate film has a thickness of at least about 40 µm.

19. The process according to claim 18, wherein the substrate film has a multilayer laminate structure.

* * * * *